(12) United States Patent
Takagi

(10) Patent No.: US 7,487,098 B2
(45) Date of Patent: Feb. 3, 2009

(54) METHOD FOR MAINTAINING PRODUCT AND MAINTENANCE BUSINESS SYSTEM FOR PRODUCT

(75) Inventor: Tadao Takagi, Yokohama (JP)

(73) Assignee: Nikon Corporation, Tokyo (JP)

( * ) Notice: Subject to any disclaimer, the term of this patent is extended or adjusted under 35 U.S.C. 154(b) by 1006 days.

(21) Appl. No.: 09/941,863

(22) Filed: Aug. 30, 2001

(65) Prior Publication Data

US 2002/0059109 A1 May 16, 2002

(30) Foreign Application Priority Data

Sep. 1, 2000 (JP) .............................. 2000-265653

(51) Int. Cl.
*G06Q 99/00* (2006.01)
(52) U.S. Cl. ......................................................... 705/1
(58) Field of Classification Search ....................... 705/1
See application file for complete search history.

(56) References Cited

U.S. PATENT DOCUMENTS

| | | | | |
|---|---|---|---|---|
| 5,208,762 A | * | 5/1993 | Charhut et al. .............. 700/216 |
| 5,875,434 A | * | 2/1999 | Matsuoka et al. .............. 705/28 |
| 5,936,863 A | * | 8/1999 | Kostelnik et al. ............ 700/171 |
| 5,999,920 A | * | 12/1999 | Sato et al. .................... 705/400 |
| 6,032,184 A | * | 2/2000 | Cogger et al. ................ 709/223 |
| 6,070,149 A | * | 5/2000 | Tavor et al. .................... 705/26 |
| 6,216,108 B1 | * | 4/2001 | LeVander ....................... 705/7 |
| 6,378,075 B1 | * | 4/2002 | Goldstein et al. .............. 726/5 |
| 6,473,718 B1 | * | 10/2002 | Bierschenk et al. ......... 702/155 |
| 6,487,479 B1 | * | 11/2002 | Nelson .......................... 701/29 |
| 6,493,680 B2 | * | 12/2002 | Logan et al. ................... 705/34 |
| 6,535,294 B1 | * | 3/2003 | Arledge et al. ............. 358/1.15 |
| 6,581,045 B1 | * | 6/2003 | Watson ........................ 705/400 |
| 6,601,038 B1 | * | 7/2003 | Kolls ........................... 705/14 |
| 6,721,762 B1 | * | 4/2004 | Levine et al. ............. 707/104.1 |
| 6,754,637 B1 | * | 6/2004 | Stenz ........................... 705/26 |
| 2001/0051884 A1 | * | 12/2001 | Wallis et al. .................... 705/4 |

* cited by examiner

*Primary Examiner*—Jonathan Ouellette
(74) *Attorney, Agent, or Firm*—Oliff & Berridge, PLC

(57) ABSTRACT

A product maintenance method according to the present invention includes: receiving access regarding a repair request for a product from a terminal of a user who uses the product via the Internet; transmitting screen information with regard to repair conditions set for repairing the product to the terminal of the user via the Internet; and receiving an agreement to the repair conditions and a repair request for the product from the terminal of the user via the Internet.

10 Claims, 5 Drawing Sheets

METHOD FOR MAINTAINING PRODUCT AND MAINTENANCE BUSINESS SYSTEM FOR PRODUCT

INCORPORATION BY REFERENCE

The disclosure of the following priority application is herein incorporated by reference:
Japanese Patent Application No. 2000-265653 filed Sep. 1, 2000.

BACKGROUND OF THE INVENTION

1. Field of the Invention

The present invention relates to a product maintenance method and a product maintenance business system that may be adopted in product repair, product adjustment and the like.

2. Description of the Related Art

When a user of a product such as a camera needs to have the product repaired or adjusted by the manufacturer, the user normally brings the product into a service center or a retailer and requests the repair or adjustment to be performed on the product through the service center or the retailer. Then, when the repair or adjustment is completed, the user picks up the product at the service center or the retailer where he also pays for the service.

Such a product maintenance system in the prior art that requires the user to bring the product into a specified service center or retailer for service has proved to be troublesome and time-consuming for the user.

In addition, while a product such as a camera or an electronic instrument that must be handled with care needs to be shipped in a secure package, the box in which the product was packed at the time of purchase has often been discarded or lost. When shipping the product for service directly to the manufacturer through a carrier, this may pose a problem in that the product cannot be packed in a compact and secure package.

There is also a problem in the product maintenance system in the prior art in that it fails to offer the user peace of mind since it does not provide the user with detailed progress status updates on the product being repaired or adjusted.

Furthermore, since the product is shipped via a number of middlemen in a complicated distribution path including the retailer in the product maintenance system in the prior art, the cost of having the product repaired or adjusted is bound to be high.

SUMMARY OF THE INVENTION

An object of the present invention is to enable a product maintenance business offering such services as product repair and product adjustment to be carried out in a rational manner via the Internet.

In order to attain the above object, a product maintenance method according to the present invention comprises: receiving access regarding a repair request for a product from a terminal of a user who uses the product via the Internet; transmitting screen information with regard to repair conditions set for repairing the product to the terminal of the user via the Internet; and receiving an agreement to the repair conditions and a repair request for the product from the terminal of the user via the Internet.

It is preferred that this product maintenance method further comprises: transmitting screen information for displaying an input screen to enable entry of user information including information with regard to a product to be repaired to the terminal of the user via the Internet; receiving the user information from the terminal of the user via the Internet; assigning a repair order ID corresponding to the repair request is assigned; storing the user information in a storage device together with the repair order ID; and transmitting information indicating the repair order ID to the terminal of the user via the Internet.

Another product maintenance method according to the present invention comprises: receiving a repair request for a product from a terminal of a user who uses the product via the Internet; selecting a packing box corresponding to the product, the repair request for which has been received, based upon product information stored in a database; and transmitting information instructing delivery of the selected packing box to the user, to a server of a transport operator via the Internet.

It is preferred that this product maintenance method further comprises: transmitting information instructing that the product packed in the packing box be picked up from the user to the server of the transport operator via the Internet; and transmitting information instructing delivery of the product that has been repaired to the user, to the transport operator via the Internet upon completion of repair of the product.

Another product maintenance method according to the present invention comprises: receiving a repair request for a product from a terminal of a user who uses the product via the Internet; and transmitting information regarding the product which enables a transport operator to select a packing box corresponding to the product the repair request for which has been received, and information instructing delivery of the selected packing box to the user, to a server of the transport operator via the Internet.

It is preferred that this product maintenance method further comprises: transmitting information instructing that the product packed in the packing box be picked up from the user transmitted to the server of the transport operator via the Internet; and transmitting information instructing delivery of the product that has been repaired to the user, to the transport operator via the Internet upon completion of repair of the product. In this case, it is preferred that the product maintenance method further comprises: transmitting an repair cost estimate for the product, the repair request for which has been received, to the terminal of the user via the Internet prior to starting a repair work; obtaining a repair approval based upon the estimate from the user via the Internet; and the repair cost estimate including a price of the packing box and a price of collecting and delivering the product.

Another product maintenance method according to the present invention comprises: receiving a repair request for a product from a terminal of a user who uses the product via the Internet; transmitting a repair cost estimate for the product, the repair request for which has been received, to the terminal of the user via the Internet; and obtaining a repair approval based upon the estimate from the user via the Internet.

It is preferred that this product maintenance method further comprises: transmitting an estimate of a repair completion date to the terminal of the user together with the estimate for the repair cost.

Another product maintenance method according to the present invention comprises: receiving a repair request for a product from a terminal of a user who uses the product via the Internet; assigning a repair order ID corresponding to the repair request; and transmitting information indicating the repair order ID to the terminal of the user via the Internet.

It is preferred that this product maintenance method further comprises: storing a repair progress status for the product at each stage including a delivery preparation status in a storage device in correspondence to the repair order ID; and when an inquiry on the repair progress status is made from the terminal of the user by indicating the repair order ID via the Internet, obtaining the repair progress status corresponding to the repair order ID from the storage device and transmitting the repair progress status thus obtained to the terminal of the user via the Internet.

Another product maintenance method according to the present invention comprises: receiving access regarding a repair request for a product from a terminal of a user who uses the product via the Internet; transmitting screen information with regard to repair conditions set for repairing the product to the terminal of the user via the Internet; transmitting screen information for displaying an input screen to enable entry of user information including information with regard to the product to be repaired to the terminal of the user via the Internet; receiving an agreement to the repair conditions and the user information from the terminal of the user via the Internet; determining to receive the repair request for the product; assigning a repair order ID corresponding to the repair request; storing the user information in a storage device together with the repair order ID; transmitting information indicating the repair order ID to the terminal of the user via the Internet; selecting a packing box corresponding to the product, the repair request for which has been received, based upon product information stored in a database; transmitting information instructing delivery of the selected packing box to the user, to a server of a transport operator via the Internet; transmitting information instructing that the product packed in the packing box be picked up from the user, to the server of the transport operator via the Internet; transmitting a repair cost estimate for the product, the repair request for which has been received, to the terminal of the user via the Internet prior to starting a repair work; obtaining a repair approval based upon the estimate from the terminal of the user via the Internet; storing a repair progress status for the product at each stage including a delivery preparation status in a storage device in correspondence to the repair order ID; when an inquiry on the repair progress status is made from the terminal of the user by indicating the repair order ID via the Internet, obtaining the repair progress status corresponding to the repair order ID from the storage device and transmitting the repair progress status thus obtained to the terminal of the user via the Internet; transmitting information instructing delivery of the product that has been repaired to the user, to the server of the transport operator via the Internet upon completion of repair of the product; and transmitting information instructing that a repair fee be collected to a server of a repair fee collector via the Internet upon completion of the repair on the product.

A product maintenance business system according to the present invention comprises a product user, a product maintenance business operator, a transport operator, and a repair fee collector which are connected via the Internet, and: the product maintenance business operator receives a repair request for a product from the product user, selects a packing box corresponding to the product, estimates a repair cost and repairs the product; the transport operator delivers the packing box to the product user, picks up the product to be repaired from the product user and delivers the product having been repaired to the product user; and the repair fee collector collects a repair fee.

A product maintenance business system according to the present invention for offering product repair services, comprises: a server of a product maintenance business operator that is connected with a terminal of a product user, a server of a transport operator and a server of a repair fee collector via the Internet, and the server of the product maintenance business operator executes: processing for displaying repair conditions set for a product on a homepage on the Internet; processing for inputting information from the product user indicating an agreement to the repair conditions and storing the information in a storage device; and processing for assigning a repair order number and notifying the product user of the repair order number via the Internet.

A product maintenance business system according to the present invention for offering product repair services, comprises: a server of a product maintenance business operator that is connected with a terminal of a product user, a server of a transport operator and a server of a repair fee collector via the Internet, and the server of the product maintenance business operator executes: processing for searching a packing box corresponding to a product, a repair request for which has been issued by the product user, from a database having stored therein data of different packing boxes corresponding to various types of products; and processing for issuing a request to the transport operator for delivery of the packing box that has been selected through a search to the product user via the Internet.

A product maintenance business system according to the present invention for offering product repair services, comprises: a server of a product maintenance business operator; and a server of a transport operator, and: the server of the product maintenance business operator and the server of the transport operator are connected with each other and are also connected with a terminal of a product user and a server of a repair fee collector, via the Internet; the server of the product maintenance business operator transmits information indicating a type of product, a repair request for which has been issued by the product user, and a request for packing box delivery, to the server of the transport operator via the Internet; and the server of the transport operator server searches a packing box corresponding to the product, the repair request for which has been issued by the product user, from a database having stored therein data representing different packing boxes corresponding to various types of products.

A product maintenance business system for offering product repair services according to the present invention, comprises: a server of a product maintenance business operator that is connected with a terminal of a product user, a server of a transport operator and a server of a repair fee collector via the Internet, wherein the server of the product maintenance business operator executes: processing for transmitting a repair cost estimate for the product, the repair request for which has been issued by the product user, to the product user in an electronic mail via the Internet; and processing for receiving an approval of contents of the repair cost estimate and the repair request from the product user via the Internet.

In this product maintenance business system, it is preferred that the server of the product maintenance business operator estimates a delivery completion date in addition to estimating a repair cost for the product and transmits the repair cost estimate with the repair completion date entered therein.

Also, it is preferred that the repair cost includes fees for a price of a packing box delivered to the product user and fees for delivering the packing box and delivering the product to be repaired.

A product maintenance business system according to the present invention for offering product repair services, comprises: a server of a product maintenance business operator that is connected with a terminal of a product user, a server of a transport operator and a server of a repair fee collector via the Internet, and: the server of the product maintenance business operator assigns a repair order number and notifies the product user of the repair order number via the Internet upon receiving a repair order for a product from the product user via the Internet, and identifies the product under repair in correspondence to the repair order number when there is an inquiry from the product user.

Another product maintenance business system according to the present invention, comprises: a product user, a product maintenance business administrator, a product repair service operator, a transport operator and a repair fee collector which are connected via the Internet, and: the product maintenance business administrator receives a repair request for a product from the product user and selects a packing box corresponding to the product; the product repair service operator estimates a repair cost and repairs the product; the transport operator delivers the packing box to the product user, picks up the product to be repaired from the product user and delivers the product having been repaired to the product user; and the repair fee collector collects a repair fee.

A product maintenance business system according to the present invention for offering product repair services, comprises: a server of a product maintenance business administrator that is connected with a terminal of a product user, a server of a product repair service operator, a server of a transport operator and a server of a repair fee collector via the Internet, and the server of the product maintenance business administrator executes: processing for displaying repair conditions set for a product on a homepage on the Internet; processing for inputting information from the product user indicating an agreement to the repair conditions and storing the information in a storage device; and processing for assigning a repair order number and notifying the product user of the repair order number via the Internet.

A product maintenance business system according to the present invention for offering product repair services, comprises: a server of a product maintenance business administrator that is connected with a terminal of a product user, a server of a product repair service operator, a server of a transport operator and a server of a repair fee collector via the Internet, and the product maintenance business administrator server executes: processing for searching a packing box corresponding to a product, a repair request for which has been issued by the product user, from a database having stored therein data of different packing boxes corresponding to various types of products; and processing for issuing a request to the transport operator for delivery of the packing box that has been selected through a search to the product user via the Internet.

A product maintenance business system according to the present invention for offering product repair services, comprises: a server of a product maintenance business administrator; and a server of a transport operator, and: the server of the product maintenance business administrator and the server of the transport operator are connected with each other and are also connected with a terminal of a product user, a server of a product repair service operator and a server of a repair fee collector via the Internet; the server of the product maintenance business administrator transmits information indicating a type of a product, a repair request for which has been issued by the product user, and a request for packing box delivery to the server of the transport operator via the Internet; and the transport operator server searches a packing box corresponding to the product, the repair request for which has been issued by the product user, from a database having stored therein data representing different packing boxes corresponding to various types of products.

A product maintenance business system according to the present invention for offering product repair services, comprises: a server of a product maintenance business administrator that is connected with a terminal of a product user, a server of a product repair service operator, a server of a transport operator and a server of a repair fee collector via the Internet, and: the server of the product maintenance business administrator executes: processing for transmitting a repair cost estimate for the product, a repair request for which has been issued by the product user, to the product user in an electronic mail via the Internet; and processing for receiving an approval of contents of the repair cost estimate and the repair request from the product user via the Internet.

In this product maintenance business system, it is preferred that the server of the product maintenance business administrator estimates a delivery completion date in addition to estimating a repair cost for repairing the product and transmits the repair cost estimate with the repair completion date entered therein.

Also, it is preferred that the repair cost includes fees for a price of a packing box delivered to the product user and fees for delivering the packing box and delivering the product to be repaired.

A product maintenance business system according to the present invention for offering product repair services, comprises: a server of a product maintenance business administrator that is connected with a terminal of a product user, a server of a product repair service operator, a server of a transport operator and a server of a repair fee collector via the Internet, and: the server of the product maintenance business administrator assigns a repair order number and notifies the product user of the repair order number via the Internet upon receiving a repair order for a product from the product user via the Internet, and identifies the product under repair in correspondence to the repair order number when there is an inquiry from the product user.

A computer-readable computer program product contains a program for product maintenance processing, and the program comprises instructions that execute steps described in each of the above product maintenance methods.

It is preferred that the computer-readable computer program product is a recording medium on which the program is recorded.

It is preferred that the computer-readable computer program product is a carrier wave in which the program is embodied as a data signal.

DESCRIPTION OF THE PREFERRED EMBODIMENT

Figure 1:
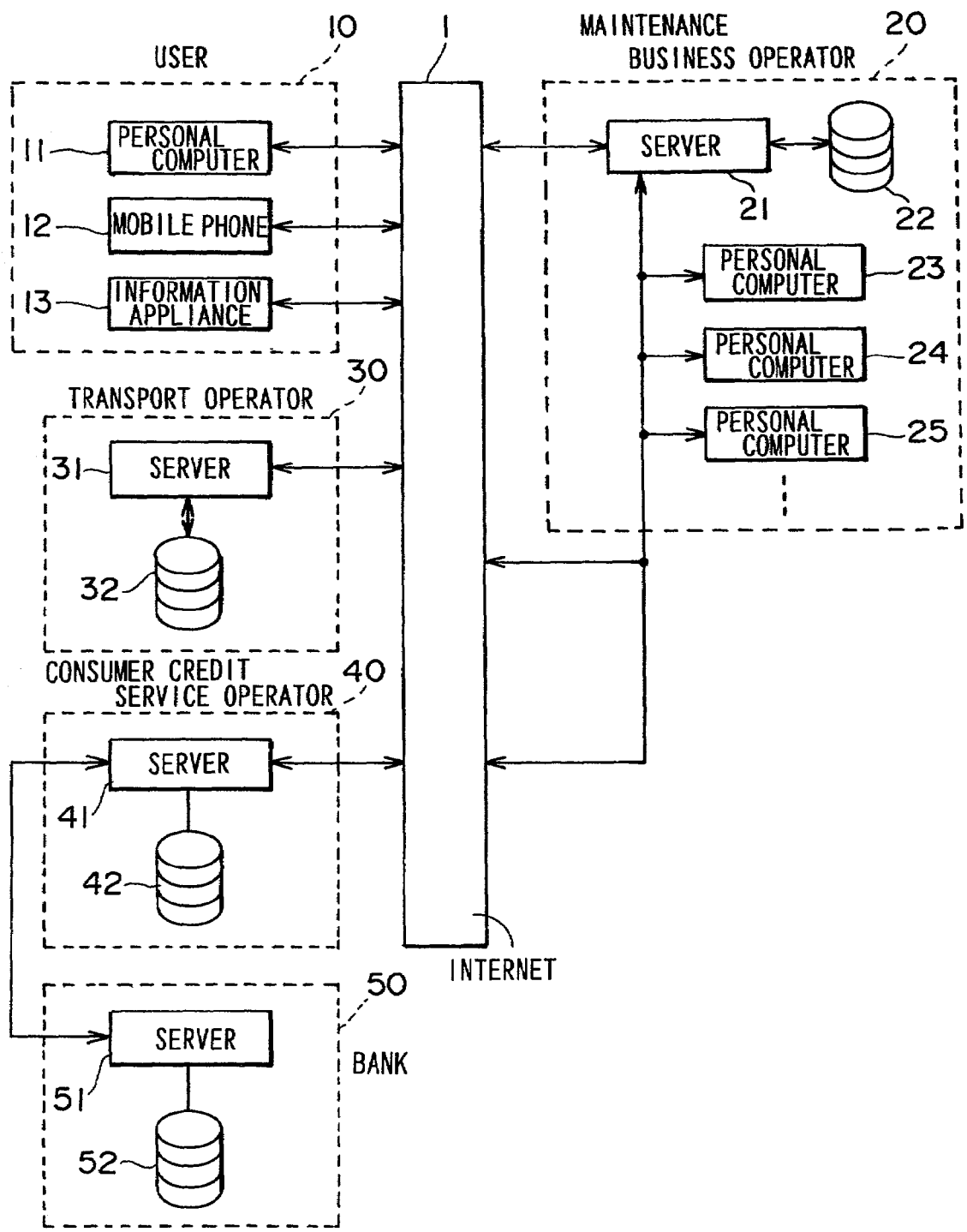
FIG. 1 illustrates the structure adopted in the product maintenance business achieved in an embodiment of the present invention.

FIG. 1 shows the structure adopted in the product maintenance business achieved in an embodiment. The product maintenance business in the embodiment is implemented through the exchange of various types of information carried out via the Internet 1 by a user 10 who uses a product, a maintenance business operator 20 who offers maintenance services such as product repair and adjustment, a transport operator 30 who delivers products and packing boxes and a consumer credit service operator 40 who collects the repair fees.

The user 10 engages in communication with the maintenance business operator 20 via a personal computer 11, a mobile telephone (cellular phone) 12 or an information appliance 13 such as a television set connected to the Internet to request a repair or adjustment service on the product.

The maintenance business operator 20 may be the manufacturer of the product such as a camera manufacturer or a contractor specializing in product repair. The maintenance business operator 20 engages in communication with the user 10, the transport operator 30 and the consumer credit service operator 40 via a server 21 connected to the Internet 1 and performs the repair or re-adjustment on the product. It is to be noted that a data base 22 having stored therein user information and product information and personal computers 23, 4, ... of individual service persons are connected to the server 21 at the maintenance business operator 20.

The transport operator 30 engages in communication with the maintenance business operator 20 via a server 31 connected to the Internet 1, and delivers packing boxes to the user 10, picks up the repair item from the user 10 or delivers the repaired product to the user 10 in response to an instruction from the maintenance business operator 20. A database 32 having stored therein information related to various products handled by the maintenance business operator 20 and the like are connected to the server 31 at the transport operator 30. This transport operator 30 should be a home delivery service operator.

The consumer credit service operator 40 engages in communication with the maintenance business operator 20 via a server 41 connected to the Internet 1, and collects the repair fee by withdrawing the fee from the user's account 10 at a settlement bank 50 in response to an instruction from the maintenance business operator 20. A database 42 having stored therein information including the card number of the user 10 and the like are connected to the server 41 at the consumer credit service operator 40.

A server 51 at the bank 50 is connected with the server 41 at the consumer credit service operator 40 online or via the Internet 1 (they are connected online in the embodiment) and upon receiving an instruction from the consumer credit service operator 40, the bank 50 withdraws the product repair fee from the user's account 10 and pays it out to the consumer credit service operator 40. A database 52 having stored therein information with regard to the user's account 10 and the like are connected to the server 51 at the bank 50.

Figure 2:
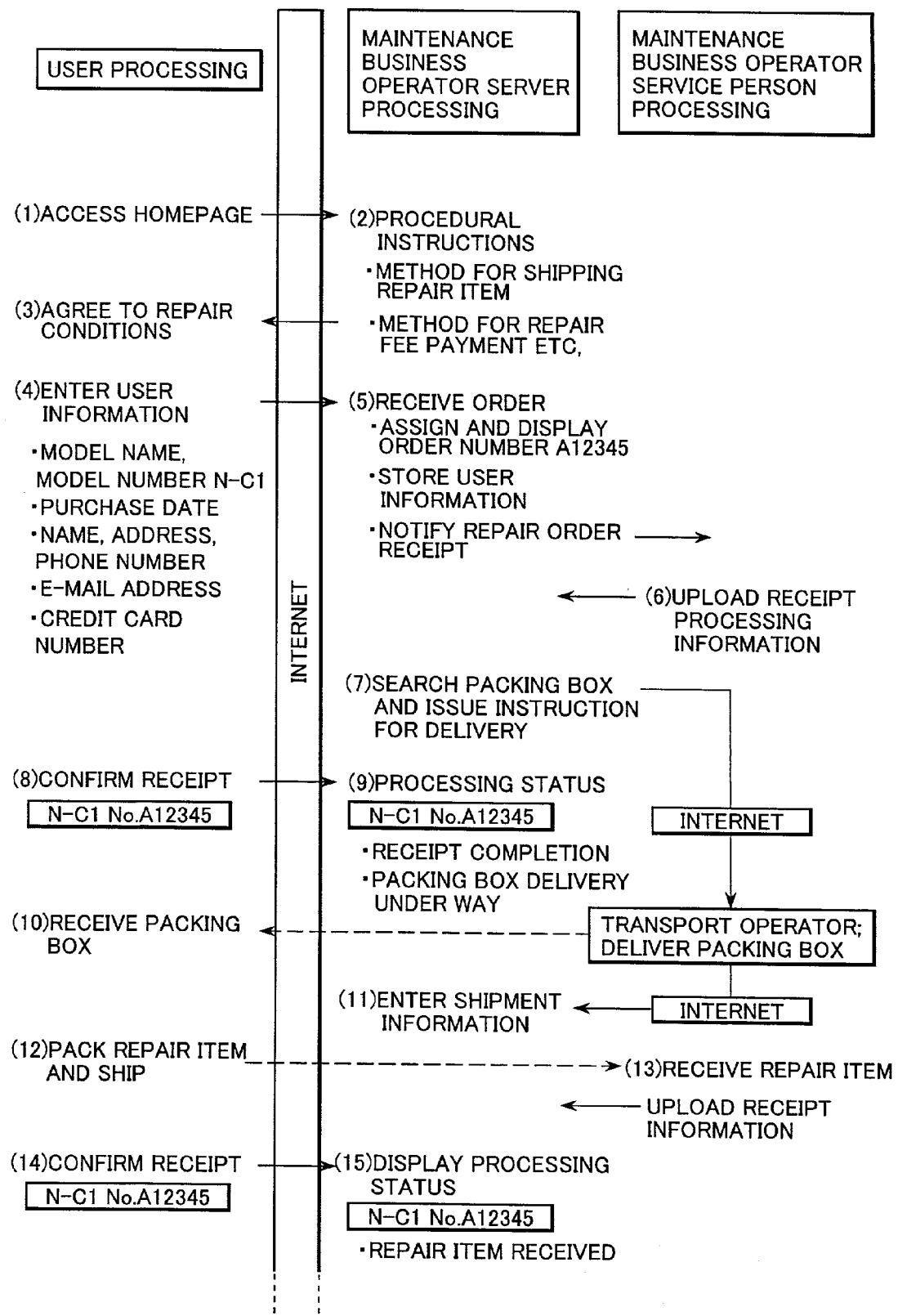
FIG. 2 is a flowchart of the processing implemented by the product maintenance business in the embodiment.
Figure 3:
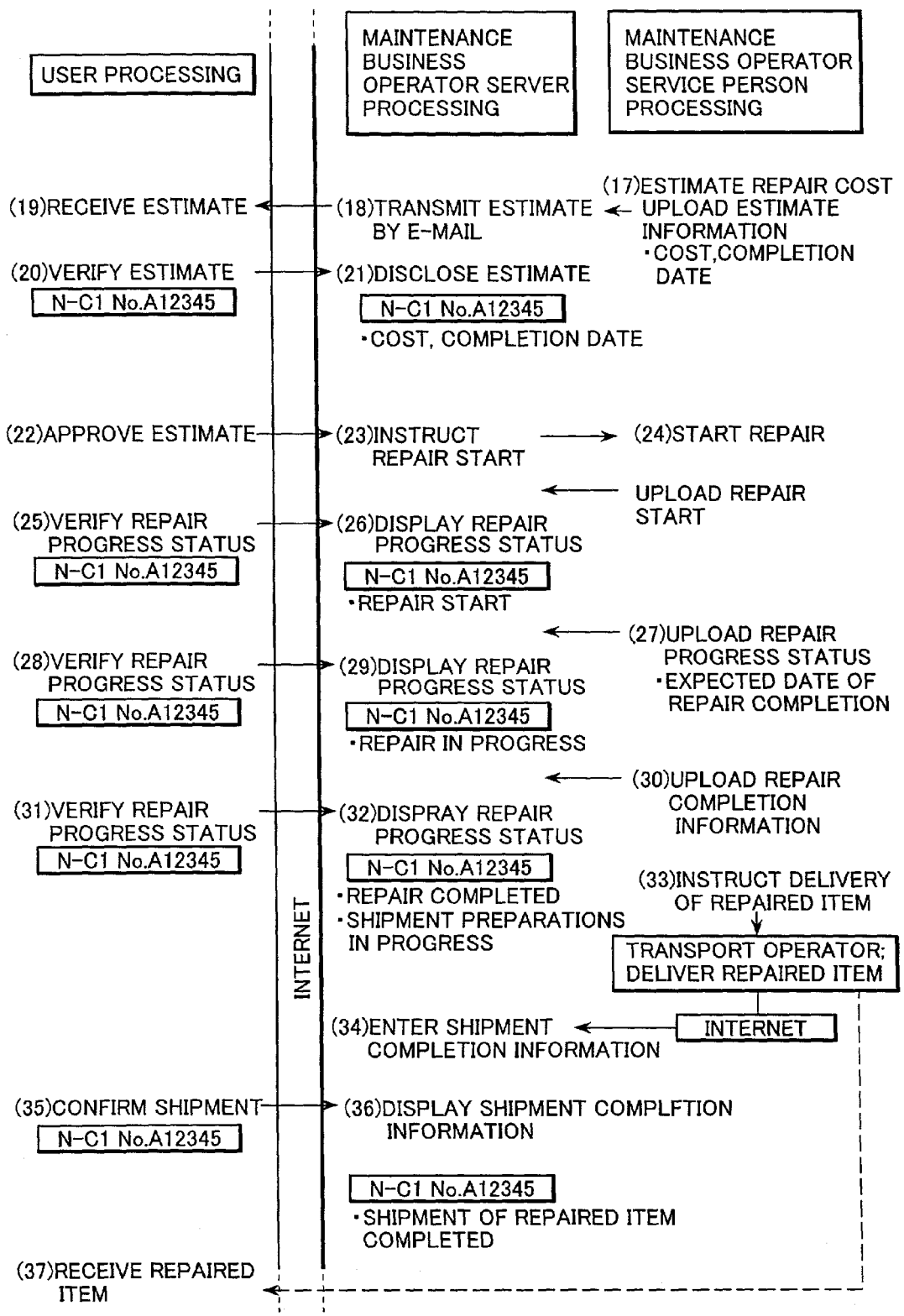
FIG. 3 presents a flowchart of the processing implemented by the product maintenance business in the embodiment, in continuation from FIG. 2.
Figure 4:
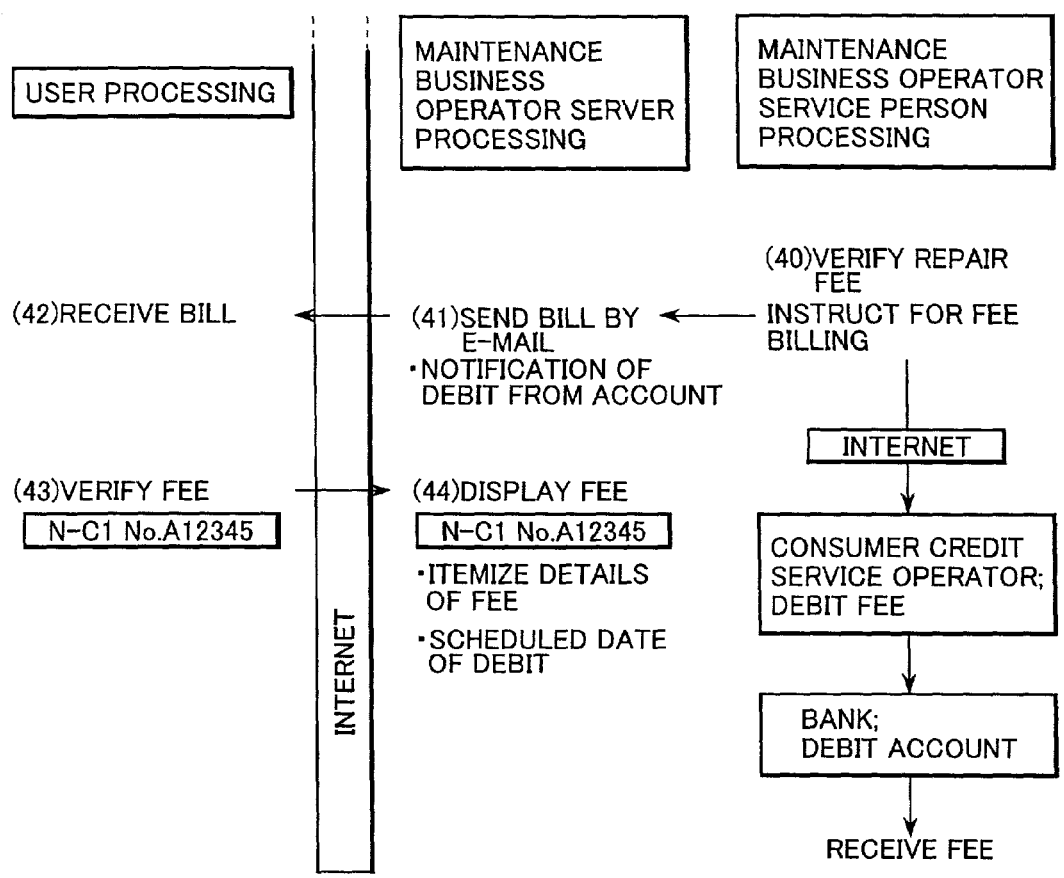
FIG. 4 presents a flowchart of the processing implemented by the product maintenance business in the embodiment, in continuation from FIG. 3.

FIGS. 2-4 present a flowchart of the processing implemented in the product maintenance business. Now, the processing implemented in the product maintenance business in the embodiment is explained in reference to the flowchart.

First, the user 10, wishing to have a product repaired, accesses the homepage of the maintenance business operator 20 via the Internet 1 by using any of the personal computer 11, the mobile telephone 12 and the information appliance 13 (step 1). The server 21 at the maintenance business operator 20 brings up a display of repair conditions, i.e., the procedures to be followed in the product repair such as a method for shipping the repair item and the method of repair fee payment, onto the homepage on the Internet 1 (step 2). These repair conditions have been set forth by the service person at the maintenance business operator 20.

The user 10 verifies the repair conditions brought up on display at the Internet homepage by the server 21 at the maintenance business operator 20, and if he finds them agreeable, he inputs user information (steps 3-4). The user information includes the product model name, the model number, the purchase date, the user name, the user address, the user phone number, the user e-mail address and the number of the credit card to be used for payment.

The server 21 assigns a repair order number to the user 10 wishing to have the product repaired and displays the assigned repair order number (step 5). This repair order number is used to identify the item being repaired, and in the repair service operation, the repair item is managed and reference to the repair order number. It is to be noted that an explanation is given in reference to the embodiment by assuming that N-Cl is the model number of the repair item and that the repair order number is A12345. The server 21 at the maintenance business operator 20 stores the user information in the database 22 together with the repair order number, and notifies the service persons that a repair order for a product N-Cl assigned with a repair order number A12345 has been received via the personal computers 23, 24, . . . .

A service person at the maintenance business operator 20 performs order processing such as assigning the repair person who is to perform the repair as stipulated in a repair manual and uploads order processing completion information to the server 21 (step 6). The server 21 at the maintenance business operator 20 searches a packing box suitable for the broken down product (repair item) to be repaired in the database 22 and transmits a packing box shipping instruction to the server 31 of the transport operator 30 via the Internet 1 (step 7). It is to be noted that the packing box shipping instruction includes information such as the address and the name of the user who has requested the repair service.

Data with regard to various types of packing boxes suitable for different products are stored in correspondence to their model names and model numbers, and the server 21 searches the correct type of packing box corresponding to the model name and model number of the repair item in the database 22 and requests the transport operator 30 to deliver the packing box by specifying the exact type of packing box required by the user. It is to be noted that the packing box in the smallest possible size that assures safety of the product during transportation should be selected to reduce the transportation cost. The transport operator 30 delivers the specified packing box to the user 10 and transmits packing box shipping information to the server 21 at the maintenance business operator 20 via the Internet 1 (steps 10-11). It is to be noted that the packing box shipping information includes information indicating the price of the packing box and the shipping fee.

It is to be noted that the data concerning different types of packing boxes corresponding to the various model names and model numbers may be stored in advance in the database 32 at the transport operator 30 to enable the transport operator 30 to select the proper packing box for the product to be repaired upon being notified by the maintenance business operator 20 of the model name and model number of the product. In addition, the packing box shipping instruction may be issued by the service person at the maintenance business operator 20 to the transport operator 30.

The user 10 may access the homepage of the maintenance business operator 20 via the Internet 1 to confirm that the maintenance business operator 20 has received the repair order by entering the repair order number (step 8). In response to the request for the repair order confirmation from the user 10, the server 21 at the maintenance business operator 20 displays the order processing status, e.g., information indicating that the order has been processed and the packing box is being delivered if the order processing has been completed (step 9).

Upon receiving the packing box, the user 10 packs the repair item in the packing box and ships it to the maintenance business operator 20 (step 12). The service person at the maintenance business operator 20 uploads repair item reception completion information to the server 21 when the repair item sent by the user 10 is received (step 13).

After sending the repair item, the user 10 may access the homepage of the maintenance business operator 20 via the Internet 1 to confirm that the maintenance business operator 20 has received the repair item by entering the repair order number (step 14). In response to the request for the repair item reception verification from the user 10, the server 21 at the maintenance business operator 20 displays information indicating whether or not the repair item has been received, i.e., information indicating that the repair item has been received if the repair item has been delivered (step 15).

Next, the service person at the maintenance business operator 20 examines the repair item, estimates the repair cost and the delivery date and uploads the estimate information to the server 21 (step 17). It is to be noted that this repair estimate includes the price of the packing box and the delivery cost in addition to the repair cost to be charged for the repair work. The server 21 at the maintenance business operator 20 prepares a repair estimate form based upon the repair information provided by the service person and transmits the repair estimate form to the user 10 in an electronic mail via the Internet 1 (step 18). The user 10 verifies the details upon receiving the repair estimate form (step 19).

It is to be noted that the user 10 may access the homepage of the maintenance business operator 20 via the Internet 1 to make an inquiry on the repair estimate details by entering the repair order number (step 20). In response to the repair estimate inquiry from the user 10, the server 21 at the maintenance business operator 20 displays the estimate details (step 21).

If the user 10 decides that the repair estimate provided by the maintenance business operator 20 is reasonable, he sends a repair approval estimate and a repair request electronic mail to the maintenance business operator 20 via the Internet 1 (step 22). The server 21 at the maintenance business operator 20 issues an instruction to start repair work on the repair item with the model number N-C1 assigned with the repair order number A12345 to one of the personal computers 23, 24, . . . of the service persons (step 23). The service person starts the repair work on the repair item as stipulated in the repair manual and notifies the server 21 of the repair start (step 24).

The user 10 may access the homepage of the maintenance business operator 20 via the Internet 1 to confirm the repair start by entering the repair order number (step 25). In response to the inquiry on the repair progress status from the user 10, the server 21 at the maintenance business operator 20 displays the repair progress status, e.g., information indicating that the repair work has started if the repair on the item has started (step 26).

At each stage of the repair work, e.g., the disassembly of the repair item, the acquisition of a replacement for a defective part and the actual replacement work or the reassembly and adjustment of the repair item, the service person at the maintenance business operator 20 uploads the repair progress status and the expected date of repair completion to the server 21 (step 27). The user 10 may access the homepage of the maintenance business operator 20 via the Internet 1 any time to check the repair progress status (step 28). In response to any inquiry on the repair progress status from the user 10, the server 21 at the maintenance business operator 20 displays an update of the repair progress status and the expected date of repair completion (step 29).

The service person at the maintenance business operator 20 uploads repair completion information to the server 21 upon completion of the repair work on the repair item (step 30). The user 10 may access the homepage of the maintenance business operator 20 via the Internet 1 to confirm that the repair work has been completed and the preparations for the shipment are in progress by entering the repair order number (step 31). In response to the repair progress status inquiry from the user 10, the server 21 at the maintenance business operator 20 displays the repair progress status, i.e., information indicating that the repair work has been completed and the preparations for shipment of the repaired item are in progress if the repair work on the repair item has been completed (step 32). The service person at the maintenance business operator 20 issues an instruction for repaired item shipment to the transport operator 30 (step 33) and the transport operator 30 delivers the repaired item to the user 10.

When the shipment of the repaired item is completed, the transport operator 30 notifies the maintenance business operator 20 of the repaired item shipment completion of via the Internet 1 (step 34). The user 10 may access the homepage of the maintenance business operator 20 via the Internet 1 to confirm the shipment of the repaired item by entering the repair order number. In response to the repaired item shipment inquiry from the user 10, the server 21 at the maintenance business operator 20 displays information indicating that the shipment of the repaired item has been completed (step 36). The user 10 then receives the repaired item shipped by the transport operator 30 (step 37).

The service person at the maintenance business operator 20 verifies the repair fee for the repair service and sends a fee billing instruction to the server 21. The server 21 at the maintenance business operator 20 sends a bill for the repair service and an account debit notification to the user 10 in an electronic mail. The user 10 may access the homepage of the maintenance business operator 20 via the Internet 1 to verify itemized details of the repair bill by entering the repair order number (step 43). In response to the repair fee inquiry from the user 10, the server 21 at the maintenance business operator 20 displays the itemized details of the repair fee and the scheduled date of fee debit from the account (step 44).

The service person at the maintenance business operator 20 issues an instruction for repair fee collection to the consumer credit service operator 40 via the Internet 1. The consumer credit service operator 40 debits the repair fee from the account held by the user 10 at the bank 50 and pays the repair fee to the maintenance business operator 20.

(Variation of the Embodiment of the Invention)

Figure 5:
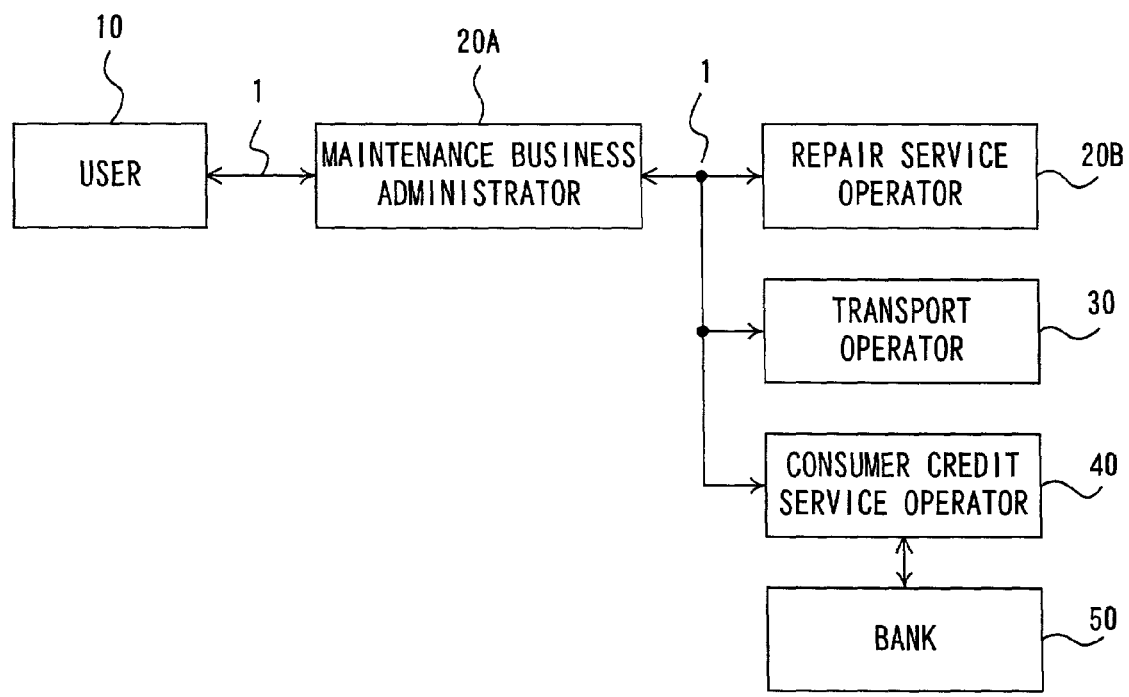
FIG. 5 illustrates a business mode adopted in a variation of the product maintenance business.

While the maintenance business operator 20 launches an Internet homepage offering product repair services, receives the repair order from the user 10, performs the repair work, issues the delivery instruction to the transport operator 30 and issues the repair fee collection instruction to the consumer credit service operator 40 in the embodiment explained above, a business mode achieved by dividing the functions of the maintenance business operator 20 in the embodiment between a maintenance business administrator 20A and a repair service operator 20B as shown in FIG. 5 may be adopted instead. It is to be noted that the same reference numerals are assigned to operators identical to those in FIG. 1 and an explanation is given by focusing on the differences from FIG. 1.

In the business mode achieved in the variation, the maintenance business administrator 20A is the primary management of the business. The maintenance business administrator 20A, who communicates with the user 10 via the Internet 1, functions as a liaison for the user 10 in offering a series of product maintenance services. The maintenance business administrator 20A also engages in communication with the repair service operator 20B, the transport operator 30, the consumer credit service operator 40 and the bank 50. The maintenance business administrator 20A as referred to in this context may be a trading company or the carrier may also function as the maintenance business administrator. The repair service operator 20B may be, for instance, the manufacturer of the products such as a camera manufacturer or a business operator specializing in product repair.

The maintenance business administrator 20A launches an Internet homepage through which product repair services are offered, receives the repair order from the user 10, issues an instruction for product repair to the repair service operator 20B, issues an instruction for delivering the repair item to be repaired and the repaired item to the transport operator 30 and issues an instruction for repair fee collection to the consumer credit service operator 40. In addition, the repair service operator 20B performs the repair work on the product and also provides an estimate, on the repair cost and the completion date.

In the business mode achieved in the variation, the maintenance business administrator 20A does not physically handle either the repair item or the repaired item, and instead, the repair item is shipped from the user 10 to the repair service operator 20B and the repaired item is shipped from the repair service operator 20B to the user 10. It is to be noted that since other aspects of the processing are similar to those in the processing achieved in the embodiment, their explanation is omitted. As in FIG. 1, the various parties in FIG. 5 are connected with each other through connections of the servers of the various business operators and the user terminal via the Internet 1.

In addition, the servers in the embodiment are each constituted of a computer such as a general purpose computer, a workstation, or a personal computer.

(1) As explained above, the product maintenance business system which enables a maintenance business offering product repair services through the Internet to be conducted in a rational manner allows the product user to have the product repaired through a simple and trouble-free procedure, and since this ultimately encourages the user to use the product over an extended period of time, the product maintenance business system contributes to major societal endeavors such as global resource conservation and waste reduction. In addition, since the volume of indirect work such as accepting and processing repair orders is reduced, the product manufacturer can improve the profitability of the product maintenance business through integration of its repair centers. It also saves the product user the trouble of bringing the repair item to the retailer or procuring proper packing boxes and allows the user to request a repair at his convenience.

(2) Freed from the restrictions imposed by the business hours of the service center or the retailer, the product user can obtain information on the procedure to follow to have the product repaired and can request a repair at a convenient time.

(3) Since the proper packing box appropriate for packing the product for a repair that has been requested by the product user is automatically selected and the instruction to ship the packing box automatically is issued to the carrier, the volume of indirect work involved in a repair service is reduced for the product manufacturer. From the product users viewpoint, since the optimal packing box for the product is selected and delivered, the trouble of finding the proper packing box is eliminated and as the product is packed in a compact and secure package, the product shipping cost is minimized.

(4) Since an accurate estimate on the repair cost is provided to the product user prior to the start of the repair work, the product user can place a repair order without worries. From the product manufacturer's viewpoint, since the repair work can be started after obtaining the product user approval with regard to the contents of the repair cost estimate, any trouble that might otherwise arise with regard to the repair fee payment after the repair work can be prevented.

(5) Since the product user is advised of the date of the repair completion in advance, he is allowed to make plans on resuming his use of the product after it is repaired. This also means that the product manufacturer does not need to field many inquiries from product users with regard to repair completion dates and, thus, the useless indirect work at the product manufacturer can be reduced.

(6) The product user can pay the entire product repair fee at once and thus is saved the trouble of having to make separate payments for the repair and the shipment. In addition, the manufacturer can reduce the volume of the useless indirect work as all the fees involved in the product repair can be collected at once.

(7) Since reliable responses can be provided to product user inquiries with regard to the product under repair with ease, the manufacturer can reduce the volume of the indirect work and the product user is afforded peace of mind.

It is to be noted that the server 21, the server 31, the server 41, the server 51 and the like engage in the processing described above by loading a program stored in recording media, such as the database 22, the database 32, the database 42 and the database 52 or other types of recording media. The other types of recording media include CD-ROM, magnetic tape and DVD. Alternatively, an application program server (not shown) may be connected via the Internet 1 to provide the program via the Internet 1. Namely, the program may be embodied as a data signal on a carrier wave and transmitted via the Internet 1. It is to be noted that another communication line may be used instead of the Internet 1. The program can be provided as any of various modes of computer-readable computer program products such as a recording medium or a carrier wave.

In addition, while an explanation is given in reference to the embodiment on an example in which the present invention is adopted in conjunction with a camera product, the present invention is not limited to this example. The product to be repaired may be an electronic instrument product or a mechanical product. In other words, the present invention may be adopted in conjunction with any conceivable product.

Furthermore, while an explanation is given above in reference to the embodiment on an example in which the user 10 who uses the product, the maintenance business operator 20 offering maintenance services such as product repairs and adjustments, the transport operator who delivers products and packing boxes and the consumer credit service operator 40 who collects repair fees are connected via the Internet 1, the present invention is not limited to this example. They may be connected with one another via a communication line other than the Internet. Moreover, some of them may be connected through the Internet with the rest of them connected through another communication line.

What is claimed is:

1. A product maintenance method for processing a maintenance of a product, comprising:

storing data regarding various types of packing boxes that are suitable for different products in a database;

receiving information regarding a repair request for a product from a terminal of a user who uses the product via the Internet;

automatically selecting a type of packing box that corresponds to the product for which the repair request has been received, based upon product information and the data stored in the database;

transmitting information that instructs delivery of a packing box corresponding to the selected type of packing box to the user to a server of a transport operator via the Internet;

transmitting information instructing pick up of the product packed in the packing box from the user to the server of the transport operator via the Internet; and transmitting information instructing delivery of the product that has been repaired to the user to the server of the transport operator via the Internet upon completion of repair of the product.

2. A product maintenance method for processing maintenance of a product, comprising:

receiving information regarding a repair request for a product from a terminal of a user who uses the product via the Internet;

transmitting information regarding the product that enables a server of a transport operator to automatically select a packing box corresponding to the product for which the repair request has been received from a database of the server of the transport operator that stores data representing the different packing boxes, and information instructing delivery of the selected packing box to the user to the server of the transport operator via the Internet;

transmitting information instructing pick up of the product packed in the packing box from the user to the server of the transport operator via the Internet; and transmitting information instructing delivery of the product that has been repaired to the user to the server of the transport operator via the Internet upon completion of repair of the product.

3. The product maintenance method according to claim 2, further comprising:

transmitting information regarding a repair cost estimate for the product for which the repair request has been received to the terminal of the user via the Internet prior to starting a repair work; and obtaining information regarding a repair approval based upon the estimate from the user via the Internet, the repair cost estimate including a price of the packing box and a price of picking up and delivering the product.

4. A product maintenance method for processing maintenance of a product, comprising:

receiving information regarding a repair request for a product from a terminal of a user who uses the product via the Internet;

transmitting information regarding repair conditions set for repairing the product to the terminal of the user via the Internet;

transmitting screen information for displaying an input screen that enables entry of user information with regard to the product to be repaired to the terminal of the user via Internet;

receiving information regarding an agreement of the repair conditions and the user information from the terminal of the user via the Internet;

determining to receive the repair request for the product;

assigning a repair order ID corresponding to the repair request;

storing the user information in a storage device together with the repair order ID;

transmitting information indicating the repair order ID to the terminal of the user via the Internet;

storing data regarding various types of packing boxes that are suitable for different products in a database;

automatically selecting a type of packing box that corresponds to the product for which the repair request has been received based upon product information and the data stored in the database;

transmitting information that instructs delivery of a packing box corresponding to the selected type of packing box to the user to a server of a transport operator via the Internet;

transmitting information instructing pick up of the product packed in the packing box from the user to the server of the transport operator via the Internet;

transmitting information regarding a repair cost estimate for the product for which the repair request has been received to the terminal of the user via the Internet prior to starting a repair work;

obtaining information regarding a repair approval based upon the estimate from the terminal of the user via the Internet;

storing a repair progress status for the product at each stage in a storage device in correspondence to the repair order ID, the repair progress status including a delivery preparation status;

when an inquiry on the repair progress status is made from the terminal of the user by indicating the repair order ID via the Internet, obtaining the repair progress status corresponding to the repair order ID from the storage device and transmitting information regarding the repair progress status obtained to the terminal of the user via the Internet;

transmitting information instructing delivery of the product that has been repaired to the user to the server of the transport operator via the Internet upon completion of repair of the product; and transmitting information instructing that a repair fee be collected to a server of a repair fee collector via the Internet upon completion of the repair on the product.

5. A product maintenance business system for offering product repair services, comprising:

a server of a product maintenance business operator that is connected with a terminal of a product user, a server of a transport operator and a server of a repair fee collector via the Internet, wherein the server of the product maintenance business operator executes:

processing for storing data of different types of packing boxes corresponding to various types of products in a database;

processing for automatically searching a type of packing box that corresponds to a product for which a repair request has been issued by the product user from the database that stores the data of the different types of packing boxes;

processing for issuing a request to the transport operator for delivery of a packing box that corresponds to the type of packing box that has been selected through a search to the product user via the Internet;

processing for transmitting information instructing pick up of the product packed in the packing box from the product user to the server of the transport operator via the Internet; and processing for transmitting information instructing delivery of the product that has been repaired to the product user to the server of the transport operator via the Internet upon completion of repair of the product.

6. A product maintenance business system for offering product repair services, comprising:

a server of a product maintenance business operator; and a server of a transport operator, wherein:

the server of the product maintenance business operator and the server of the transport operator are connected with each other and are also connected with a terminal of a product user and a server of a repair fee collector, via the Internet;

the server of the product maintenance business operator transmits information indicating a type of product for which a repair request has been issued by the product user, a request for packing box delivery, information instructing pick up of the product packed in the packing box from the product user, and information instructing delivery of the product that has been repaired to the product user upon completion of repair of the product to the server of the transport operator via the Internet; and the server of the transport operator stores data representing different types of packing boxes that correspond to various types of products in a database, and automatically searches a type of packing box corresponding to the product for which the repair request has been issued by the product user from the database that stores the data representing the different packing boxes.

7. A product maintenance business system for offering product repair services, comprising:

a server of a product maintenance business administrator that is connected with a terminal of a product user, a server of a product repair service operator, a server of a transport operator, and a server of a repair fee collector, wherein:

the server of the product maintenance business administrator, the server of the product repair service operator, the server of the transport operator, and the server of the repair fee collector are connected via the Internet; and the product maintenance business administrator server executes:

processing for storing data of different types of packing boxes that correspond to various types of products in a database;

processing for automatically searching a type of packing box corresponding to a product for which a repair request has been issued by the product user from the database having stored therein the data of the different packing boxes;

processing for issuing a request to the transport operator for delivery of a packing box corresponding to the type of packing box that has been selected through a search to the product user via the Internet;

processing for transmitting information instructing pick up of the product packed in the packing box from the product user to the server of the transport operator via the Internet; and processing for transmitting information instructing delivery of the product that has been repaired to the product user to the server of the transport operator via the Internet upon completion of repair of the product.

8. A product maintenance business system for offering product repair services, comprising:

a server of a product maintenance business administrator; and a server of a transport operator, wherein:

the server of the product maintenance business administrator and the server of the transport operator are connected with each other and are also connected with a terminal of a product user, a server of a product repair service operator and a server of a repair fee collector via the Internet;

the server of the product maintenance business administrator transmits information indicating a type of a product for which a repair request has been issued by the product user, a request for packing box delivery, information instructing pick up of the product packed in the packing box from the product user, and information instructing delivery of the product that has been repaired to the product user upon completion of repair of the product to the server of the transport operator via the Internet; and the transport operator server stores data representing different types of packing boxes that correspond to various types of products in a database, and automatically searches a type of packing box corresponding to the product for which the repair request has been issued by the product user from the database that stores the data representing the different packing boxes.

9. A computer-readable computer program product to be used on a computer containing a program for product maintenance processing, the program comprising:

an instruction for storing data with regard to various types of packing boxes suitable for different products in a database;

an instruction for receiving a repair request for a product from a terminal of a user who uses the program via the Internet;

an instruction for automatically selecting a type of packing box corresponding to the product for which the repair request has been received based upon product information and the data stored in the database;

an instruction for transmitting information instructing delivery of a packing box that corresponds to the type of packing box that has been selected to the user to a server of a transport operator via the Internet;

an instruction for transmitting information instructing pick up of the product packed in the packing box from the user to the server of the transport operator via the Internet; and an instruction for transmitting information instructing delivery of the product that has been repaired to the user to the server of the transport operator via the Internet upon completion of repair of the product.

10. The computer-readable computer program product according to claim 9, wherein the computer-readable computer program product is a recording medium on which the program is recorded.

* * * * *